(12) United States Patent
Cranfill et al.

(10) Patent No.: US 9,430,078 B2
(45) Date of Patent: Aug. 30, 2016

(54) PRINTED FORCE SENSOR WITHIN A TOUCH SCREEN

(75) Inventors: David Cranfill, Antioch, IL (US);
Zubin Parikh, Addison, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 1773 days.

(21) Appl. No.: 12/539,769

(22) Filed: Aug. 12, 2009

(65) Prior Publication Data
US 2011/0037721 A1  Feb. 17, 2011

(51) Int. Cl.
*G06F 3/041* (2006.01)
*G06F 3/044* (2006.01)

(52) U.S. Cl.
CPC ............ *G06F 3/0414* (2013.01); *G06F 3/044* (2013.01)

(58) Field of Classification Search
CPC .... G06F 3/0414; G06F 3/0202; G06F 3/045; G06F 2203/04113; G06F 21/36; G06F 21/32; H01L 41/083; H01L 41/0906; H01L 41/0536; H01L 41/0471; H01L 41/277
USPC .................. 345/173–178; 178/18.01–20.04; 438/50–53
See application file for complete search history.

(56) References Cited

U.S. PATENT DOCUMENTS

| | | | | |
|---|---|---|---|---|
| 5,847,690 A * | 12/1998 | Boie et al. | | 345/104 |
| 5,854,625 A * | 12/1998 | Frisch et al. | | 345/173 |
| 6,373,265 B1 | 4/2002 | Morimoto et al. | | |
| 6,459,424 B1 * | 10/2002 | Resman | G06F 3/044 | 345/173 |
| 7,064,748 B2 * | 6/2006 | Cok | | 345/173 |
| 7,106,222 B2 * | 9/2006 | Ward | G06F 3/0202 | 200/512 |
| 7,109,976 B2 * | 9/2006 | Cobian | | 345/173 |
| 7,196,694 B2 * | 3/2007 | Roberts | | 345/173 |
| 7,280,101 B2 * | 10/2007 | Miyamoto | | 345/169 |
| 7,301,435 B2 | 11/2007 | Lussey et al. | | |
| 7,395,717 B2 | 7/2008 | DeAngelis et al. | | |
| 8,077,162 B2 * | 12/2011 | Endo | | 345/177 |
| 2006/0279553 A1 * | 12/2006 | Soss | G06F 3/0414 | 345/173 |
| 2007/0262967 A1 * | 11/2007 | Rho | | 345/173 |

(Continued)

FOREIGN PATENT DOCUMENTS

| | | |
|---|---|---|
| WO | WO 00/79546 A1 | 12/2000 |
| WO | 0235461 A1 | 5/2002 |
| WO | 2011/019482 A1 | 2/2011 |

OTHER PUBLICATIONS

PCT Search Report and Written Opinion for PCT/US2010/042518, dated Dec. 14, 2010.

(Continued)

*Primary Examiner* — Sanjiv D Patel

(57) ABSTRACT

A quantum tunneling composite, or other material exhibiting changing electrical or magnetic properties as force on the material is increased, can be located within a force concentrator integrated into traditional touch screen layers to sense force applied on the touch screen. The force concentrator can be a protrusion from the layer planes of the layers in a traditional touch screen and can be formed, at least in part, from printed elements. The amount of protrusion of the force concentrator can be adjusted through multi-pass printing and thicker deposit printing. The force concentrator can also have optically clear adhesive layered over it. The force-sensitive material can be optionally pre-loaded so as to operate within a substantially linear feedback range. A sensing mechanism can be configured to detect changes in force at multiple locations or to detect the application of force irrespective of location.

25 Claims, 5 Drawing Sheets

(56) References Cited

U.S. PATENT DOCUMENTS

| | | | |
|---|---|---|---|
| 2008/0217413 A1* | 9/2008 | Tanner | G06K 19/07345 235/492 |
| 2009/0066673 A1* | 3/2009 | Molne | G06F 3/0418 345/178 |
| 2009/0231304 A1* | 9/2009 | Lee et al. | 345/174 |
| 2010/0033448 A1* | 2/2010 | Koito et al. | 345/174 |
| 2010/0045612 A1* | 2/2010 | Molne | G06F 1/1626 345/173 |
| 2010/0053112 A1* | 3/2010 | Chen | 345/174 |
| 2010/0097344 A1* | 4/2010 | Verweg | G06F 3/044 345/174 |
| 2010/0103640 A1* | 4/2010 | Brown | G06F 3/0414 361/829 |
| 2010/0149128 A1* | 6/2010 | No et al. | 345/174 |
| 2011/0037725 A1* | 2/2011 | Pryor | 345/174 |
| 2011/0063247 A1* | 3/2011 | Min | G06F 3/044 345/174 |

OTHER PUBLICATIONS

Communication pursuant to Article 94(3) EPC from EP Patent Application 10737189, dated Aug. 1, 2014, 7 pages.

Office Action with English Translation from Chinese Patent Application No. 201080035858.1, dated Jun. 23, 2014, 23 pages.

Chinese Office Action with English Translation from Chinese Patent Application No. CN201080035858.1, dated Sep. 30, 2015, 10 pages.

Chinese Office Action with English Translation from Chinese Patent Application No. CN201080035858.1, dated Mar. 17, 2015, 15 pages.

* cited by examiner

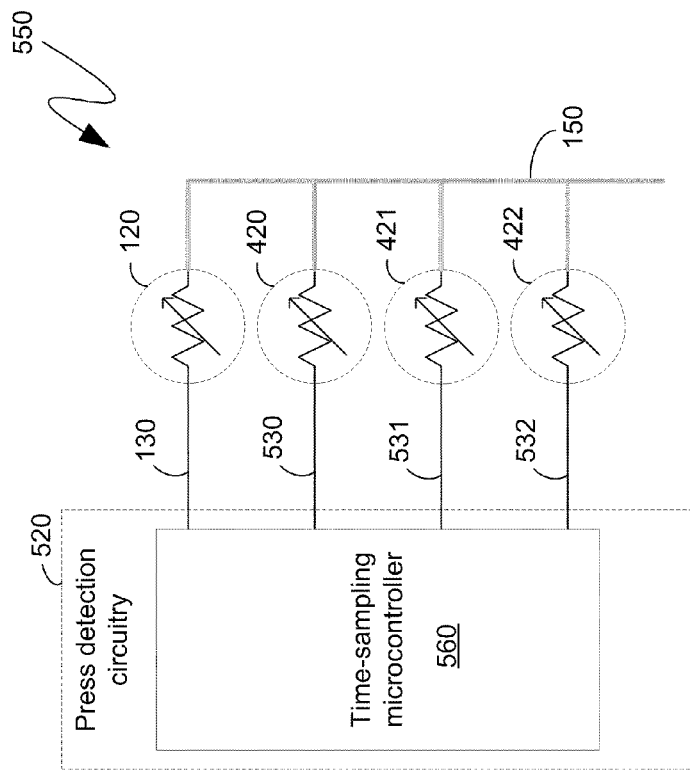
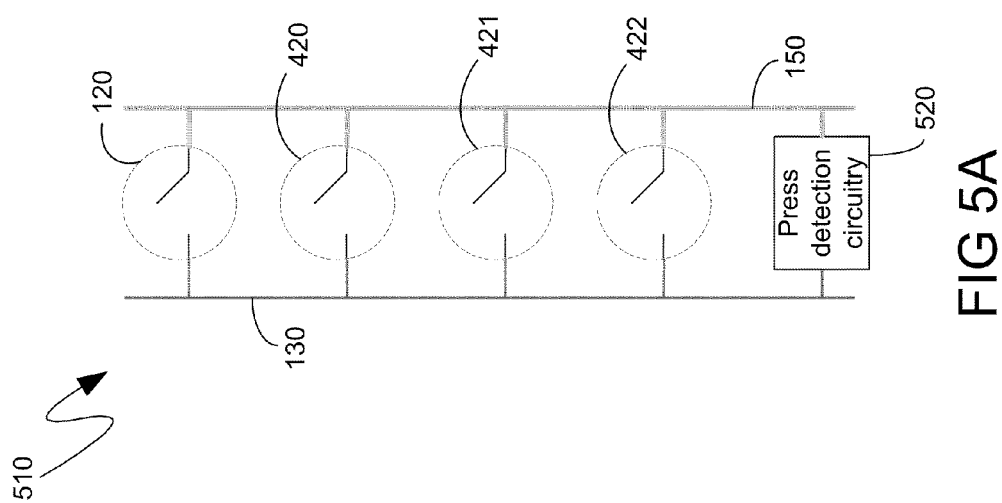
FIG 5B
FIG 5A

PRINTED FORCE SENSOR WITHIN A TOUCH SCREEN

FIELD OF THE INVENTION

This invention relates generally to touch-sensitive electronic components, and more particularly to the incorporation of a force sensor within a touch screen.

BACKGROUND OF THE INVENTION

To enable a user to interact with modern electronic devices, such devices typically comprise one or more user-manipulatable elements that provide mechanisms for converting user input into signals, typically electrical signals, that can be received and processed by the modern electronic device. Such user-manipulatable elements can include keyboards, mice, trackballs, joysticks, and other like devices that can be communicationally coupled to the electronic device through either wired or wireless communicational mechanisms.

Popular among modern electronic devices that are designed to be lightweight and portable are touch-based user-input receivers, such as a touch screen that can, within the same, or approximately the same area, both display visual information to the user and receive the touch-based input from the user. Traditionally, touch screens are designed such that a user's touch to an area of the touch screen is received and interpreted within the context of the visual information, or graphical element, being displayed in, or proximate to, that area.

Touch screens can be implemented utilizing any of several types of electromechanical mechanisms, including resistive, capacitive, infrared, surface acoustic wave and other like electromechanical mechanisms. For example, touch screens implemented utilizing resistive mechanisms typically comprise multiple transparent layers with electrically conductive coatings that are physically separated such that, when the touch screen is depressed by a user, the multiple conductive layers make contact with one another, causing electrical current to flow between them and, thereby, enabling a sensing mechanism to detect the user's touch. As another example, touch screens implemented utilizing surface acoustic wave mechanisms typically comprise at least one layer through which acoustic waves, generated by transducers attached to the layer, are propagated. When a user touches the layer, the acoustic energy is absorbed and sensors attached to the layer detect such a change and, thereby, detect the user's touch.

Many modern touch screens are implemented with capacitive mechanisms, including self capacitance sensing arrangements and mutual capacitance sensing arrangements. A touch screen implemented with a self capacitance sensing arrangement can comprise at least one layer of charged electrodes and traces such that, when a user touches, or places their finger in close proximity, to the touch screen, the charge from at least one of the charged electrodes is at least partially transferred to the user's finger, thereby affecting the capacitance of the charged electrode and, consequently, enabling a sensing mechanism to detect the user's touch. A touch screen implemented with a mutual capacitance sensing arrangement can comprise multiple layers of spatially separated and intersecting conductive traces, such that, at each intersection, a capacitive coupling node is formed. As with the self capacitance sensing arrangement, when a user touches, or places their finger in close proximity to, the touch screen, charge from at least one capacitive coupling node is transferred, at least partially, to the user's finger, again enabling sensing mechanisms to detect the user's touch due to the resulting change in capacitance.

SUMMARY OF THE INVENTION

In one embodiment, a quantum tunneling composite, or other material that can exhibit changing electrical or magnetic properties as force is applied onto the material, can be located within a force concentrator integrated into traditional touch screen layers to provide for the sensing of a press or other such force on the touch screen. The force concentrator can be a protrusion extending beyond the layer planes of the layers in a traditional touch screen.

In another embodiment, the force concentrator can be formed, at least in part, from printed elements that can be printed as part of the traditional printing process for generating a touch screen. The amount of protrusion of the force concentrator can be adjusted through commonly utilized printing techniques, including multi-pass printing and thicker deposit printing. The printed elements can have optically clear adhesive layered over them such that the optically clear adhesive also adds to the protrusion of the force concentrator.

In a further embodiment, the material that can exhibit changing electrical or magnetic properties as force is applied onto it can be optionally pre-loaded so as to operate within a substantially linear feedback range. Such substantially linear feedback can enable the detection of degrees of force being applied onto the touch screen.

In a still further embodiment, a sensing mechanism can be configured to detect changes in force at multiple locations, thereby enabling localization of the force being applied onto the touch screen. Alternatively, to save cost, the sensing mechanism can be configured to detect the application of force onto the touch screen irrespective of location.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

BRIEF DESCRIPTION OF THE DRAWINGS

The following detailed description may be best understood when taken in conjunction with the accompanying drawings, of which:

FIGS. 5A and 5B are block diagrams of two alternative exemplary press detection arrangements.

DETAILED DESCRIPTION

The following description relates to the integration of a force sensor within touch screens that operate in accordance with known multi-layer touch screen technology. The force sensor can comprise a material that can exhibit changing electrical or magnetic properties as force is applied onto the material, and can further comprise two electrodes oriented on opposite sides of such a material. The force sensor can further comprise a force concentrator that can be a protrusion, such as that formed by the electrodes and the force-sensitive material, that can extend beyond the layer plane of a layer of the touch screen. The force concentrator can act to absorb all, or substantially all, of a force applied onto the touch screen, thereby transferring that force to the force-sensitive material. The electrodes connected to the material can enable detection circuitry to detect any changes in the material's electrical or magnetic properties and can, thereby, enable the detection of a force onto the touch screen.

The techniques described herein focus on the detection of force applied onto a traditional multi-layer touch screen, such as can be found in a myriad of modern electronic devices. However, the teachings below are equally applicable to any multi-layer physical input device upon which a force, as a type of input, would be exerted and, as such, the descriptions below are not meant to limit the enumerated embodiments to the specific devices, materials or physical environments referenced.

Figure 1:
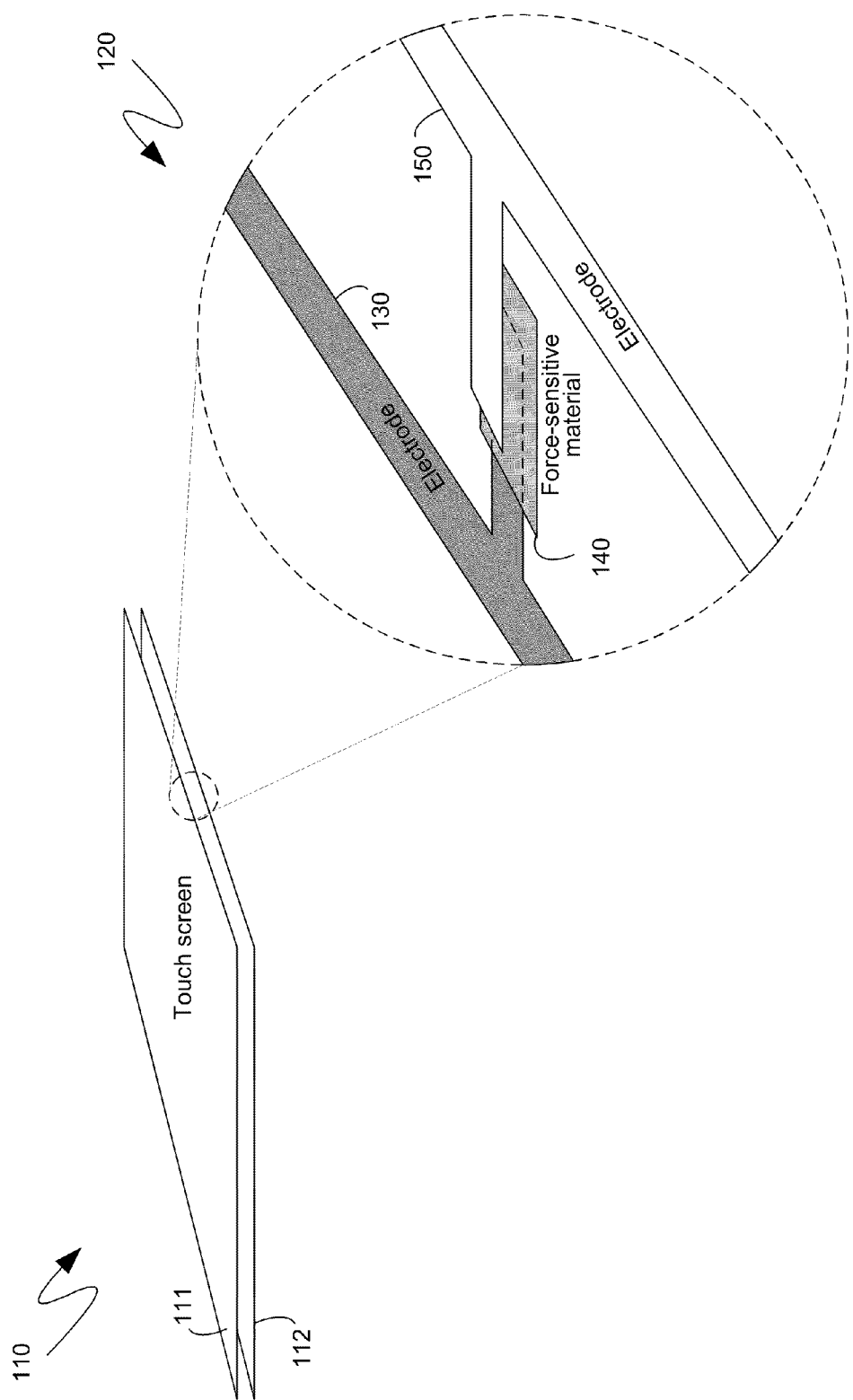
FIG. 1 is a perspective diagram of an exemplary touch screen with an integrated force sensor.

Turning to FIG. 1, a touch screen 110 is shown comprising at least two layers 111 and 112. As will be known by those skilled in the art, the layers of a touch screen, such as layers 111 and 112 of the touch screen 110, can comprise electromechanical elements that can enable the touch screen 110 to sense touch inputs. For example, if the touch screen 110 were a resistive touch screen, then each of the layers 111 and 112 could be comprised of conductive materials. A touch applied to such a touch screen 110 would cause the layers 111 and 112 to contact one another proximate to the location of the touch, thereby establishing a new conductive path between the two layers and, consequently, providing the basis by which the touch screen 110 could detect the touch. As another example, if the touch screen 110 were a mutually capacitive touch screen, then one of the layers, such as layer 111, could comprise electrodes oriented in one direction, while another of the layers, such as layer 112, could comprise electrodes oriented in a crosswise direction, thereby creating capacitive elements at their intersection. A touch applied to such a touch screen 110 would alter the capacitance at one or more of the capacitive intersections and would, thereby, provide the basis by which the touch screen 110 could detect the touch.

As shown in the enlarged perspective view provided by FIG. 1, a force sensor 120 can be integrated into such a multi-layer touch screen 110. A force-sensitive material 140 can be part of the force sensor 120. In particular, the force-sensitive material 140 can be any material that can exhibit changing electrical or magnetic properties, such as a changing conductance, as force is applied. One such material that can be utilized is a quantum tunneling composite, whose electrical conductance increases as force is applied onto the composite. The force sensor 120 can additionally comprise electrodes 130 and 150 positioned on opposite sides of the force-sensitive material 140 such that the electrodes 130 and 150 are electrically coupled by the force-sensitive material 140. For example, as illustrated in FIG. 1, the electrode 130 can be deposited on or proximate to the layer 112. The force-sensitive material 140 can then be layered at least partially on top of the electrode 130 and the electrode 150 can subsequently be layered at least partially on top of the force-sensitive material 140. In one embodiment, the electrode 130 and the electrode 150 can be aligned to substantially overlap each other on opposite sides of the force-sensitive material 140.

Figure 2:
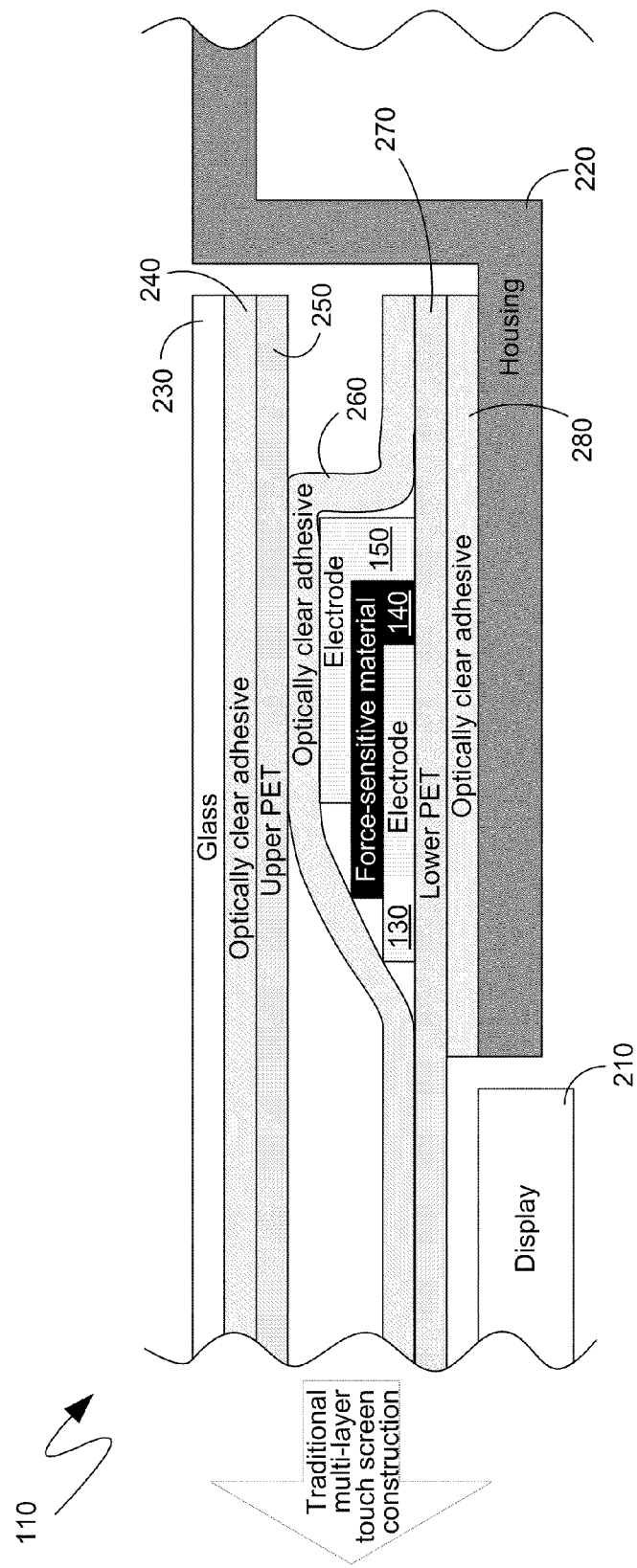
FIG. 2 is a layer diagram of an exemplary touch screen with an integrated force sensor.

Turning to FIG. 2, a two-dimensional cross-sectional slice of the touch screen 110 with an integrated force sensor is shown. More specifically, as will be understood by those skilled in the art, FIG. 2 depicts a greatly magnified cross-sectional view of an edge of the touch screen 110 as it rests on a housing 220 of an electronic device incorporating such a touch screen. Thus, the layers shown in FIG. 2 are of substantially planar elements of the touch screen 110 whose three-dimensional form would, in the orientation of the cross-section shown in FIG. 2, extend in to, and out of, the page. In addition to the touch screen 110, FIG. 2 also shows a cross-section of a portion of the housing 220 of the electronic device incorporating the touch screen 110 and a cross-section of a portion of a display 210. The display 210, as will be known by those skilled in the art, is typically part of an electronic device incorporating a touch screen, such as the touch screen 110, and is typically oriented such that the visual feedback provided by the display 210, to a user of the electronic device, is aligned with the touch screen, thereby enabling the user to interact with information displayed by the display 210 through the touch screen 110.

Traditionally, although not required, the top layer of a touch screen, such as the touch screen 110, is a layer of glass 230, or other like material that can provide optical transparency, scratch resistance, and a measure of protection to the layers below. An optically clear adhesive 240, such that it does not negatively impact the user's ability to perceive visual information presented by the display 210, can be utilized to connect and bind the glass 230 to lower layers, such as layers that can comprise electrical or magnetic elements that provide for the touch sensing abilities of the touch screen 110. As described above with reference to the exemplary layers 111 and 112, electrical or magnetic elements can be incorporated into at least some of the layers of the touch screen 110 to enable the touch screen to utilize, for example, resistive or capacitive mechanisms to sense touch inputs.

Traditionally, as will be known by those skilled in the art, a plastic, or plastic-like, substance can be utilized to carry, or otherwise provide support for, electrical or magnetic elements, such as those described above with reference to layers 111 and 112. In the cross-sectional layer diagram of FIG. 2, a PolyEthylene Terephthalate, or "PET", material 250 can provide the structure for, and can comprise, the electrical or magnetic elements referenced above with respect to layer 111. Thus, for example, if the touch screen 110 utilized mutually capacitive technologies, the upper PET 250 can comprise the electrodes oriented in one direction, described above in reference to layer 111. A similar PET material, namely the lower PET 270, can likewise provide the structure for, and can comprise, those complementary electrical or magnetic elements that were referenced above with respect to layer 112. Returning to the example of a mutually capacitive touch screen, therefore, the lower PET 270 can comprise the electrodes oriented in a direction crosswise to the electrodes of the upper PET 250, thereby providing capacitive nodes at their intersection, as described above.

As indicated previously, the upper PET 250 can be bound to the glass 230 via the optically clear adhesive 240. A similar optically clear adhesive 280 can be utilized to attach the lower PET 270 to lower layers. In the touch screen 110 illustrated in FIG. 2, the lower PET 270 can be attached directly to the housing 220 via the optically clear adhesive 280, though, in other embodiments, additional lower layers of the touch screen 110 can be integrated between the lower PET 270 and the housing 220.

As will be recognized by those skilled in the art, materials other than PET can be utilized in the layers 250 and 270 to provide support and structure for the relevant electrical or magnetic elements of such layers. Consequently, the below-described mechanisms do not require, nor are they intended to be limited to, touch screens utilizing PET layers. Indeed, as will be shown, the below-described mechanisms are equally applicable to any multi-layer touch screen, irrespective of the specific mechanisms utilized to detect touch input, and irrespective of the particular materials utilized to manufacture such a multi-layer touch screen.

Turning back to FIG. 2, the electrode 130, described previously with reference to FIG. 1, is shown in FIG. 2 as being deposited on, and positioned above, the lower PET 270. The force-sensitive material 140, also previously described with reference to FIG. 1, whose electrical or magnetic properties change as pressure is applied onto the material, is shown in FIG. 2 as being deposited on, and positioned above, at least part of the electrode 130. Lastly, the electrode 150, which was also previously described with reference to FIG. 1, is shown in FIG. 2 as being deposited on, and positioned above, at least part of both the electrode 130 and the force-sensitive material 140.

In the particular cross-section shown in FIG. 2, the electrode 130, force-sensitive material 140 and electrode 150, can be layered one on top of another. However, due to the two-dimensional aspect of FIG. 2, specific portions of the electrodes 130 and 150, and the force-sensitive material 140, extending along the dimension orthogonal to the page cannot be illustrated. In particular, as shown in FIG. 1, the force-sensitive material 140 can extend beyond the boundaries of the electrodes 130 and 150. Similarly, as will be described further below, and as can be seen from FIG. 1, portions of the electrodes 130 and 150 can extend past the force-sensitive material 140 to electrically couple other force sensors, analogous to the force sensor 120, together. Thus, the cross-section shown in FIG. 2 is meant only to be generally illustrative of a specific aspect of the layering of various elements of the touch screen 110, including various elements of the integrated force sensor 120, such as the electrodes 130 and 150 and the force-sensitive material 140.

In one embodiment, the electrode 130 can be deposited on the lower PET 270 through traditional electrode printing technologies, such as printing technologies utilizing conductive or resistive inks to form the electrode 130. Similarly, the force-sensitive material 140 can be deposited on at least a portion of the electrode 130 through printing means. For example, if a quantum tunneling composite material is utilized, such material is known to be available in an ink, or ink-like, form that can be printed in a manner similar to the printing of the electrode 130. The electrode 150 can also be deposited on the force-sensitive material 140, and the lower PET 270, in a similar printed manner, such as through the use of conductive or resistive inks. As will be known by those skilled in the art, the printing of the electrodes 130 and 150, and of the force-sensitive material 140, can result, not in the rigid, well-defined limits shown in FIG. 2, but in more curved, less well-defined limits. Such natural aspects of a printing process are not detrimental to the operation of the force sensor 120. In addition, to maintain relevant isolation, such as electrical isolation, between the electrodes 130 and 150, the force-sensitive material 140 can be deposited so as to be between the electrodes 130 and 150, not only vertically, but also horizontally along the lower PET 270.

The force sensor 120, comprising the electrodes 130 and 150, and the force-sensitive material 140, can be further covered with optically clear adhesive 260 to bind the force sensor 120, and, by proxy, the lower PET 270, to the upper PET 250. In one embodiment, such as that shown in FIG. 2, the optically clear adhesive 260 can simply be layered over the lower PET 270, the electrode 130, the force-sensitive material 140, and the electrode 150. In alternative embodiments, however, the optically clear adhesive can be more precisely applied, such as specifically being applied only to those portions of the force sensor 120 that are in contact with, and thus, can be bound to, the upper PET 250.

While, as will be recognized by those of skill in the art, that the layers of FIG. 2 are not shown to scale, the layering of electrode 130, force-sensitive material 140, electrode 150 and optically clear adhesive 260 can provide a build up of material in the areas of the force sensors that can create a protrusion from the layer plane of the lower PET 270 extending towards the upper PET 250 in at least some instances in excess of other areas that do not similarly have at least some of the layers corresponding to the force sensor. As a result, any downward pressure applied onto the top of the touch screen 110, such as the glass 230, will first cause the glass 230 and the upper PET 250 to apply an increased downward pressure at the portions of the glass coinciding with the protrusion formed by the electrode 130, the force-sensitive material 140, the electrode 150 and the optically clear adhesive 260. The protrusion, therefore, acts as a force concentrator that concentrates force applied onto the touch screen 110 onto the elements of the protrusion and, in particular, the force-sensitive material 140.

Figure 3:
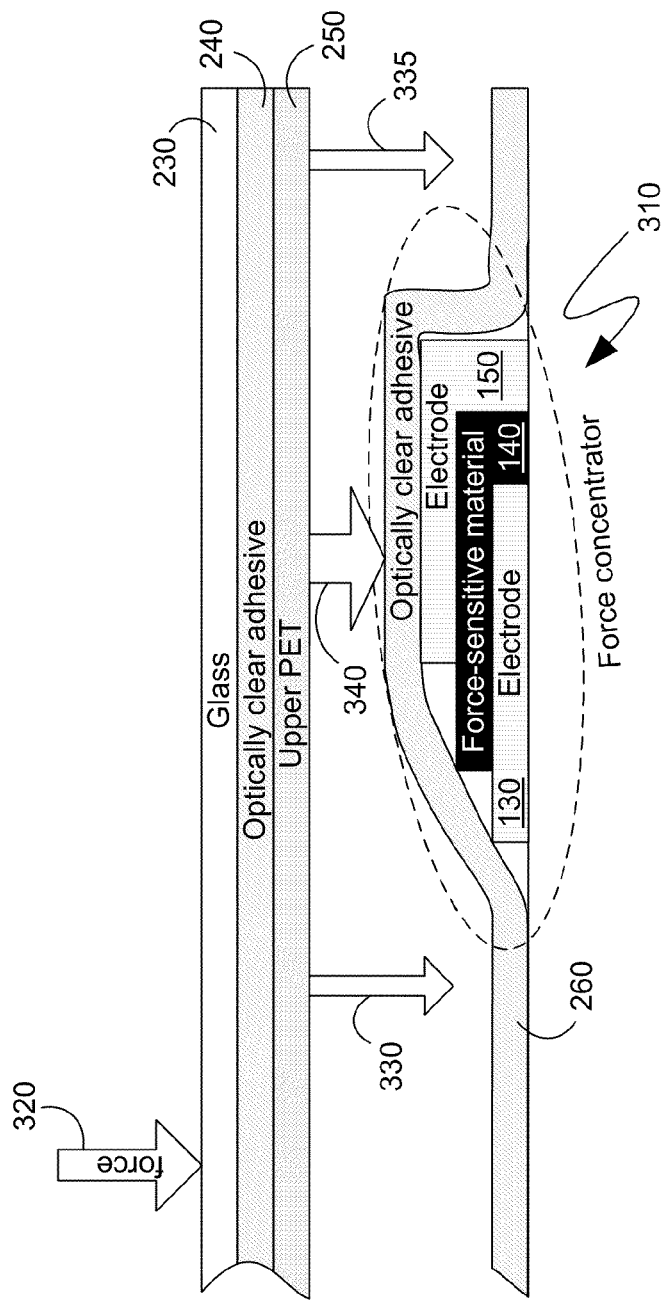
FIG. 3 is a layer diagram of an exemplary operation of a force concentrator.

Turning to FIG. 3, a simplified view of the cross-sectional diagram of FIG. 2 is provided to more clearly illustrate the force concentrating properties of the force concentrator 310, as delineated in FIG. 3. Thus, as shown, a force 320 can be applied somewhere on the top of the touch screen 110, such as on a point of the glass surface 230. As will be recognized by those skilled in the art, the glass surface 230, or whatever other material is utilized for the top of the touch screen 110, is likely to be a material that deforms very little under the sort of force 320 as would be applied by a user pressing down on the touch screen, such as with a finger. As a result, the force 320 can cause the upper layers of the touch screen 110 to move downward in a substantially equivalent manner across the whole, or a substantial majority of, the touch screen surface.

However, the downward motion of the upper layers of the touch screen 110, in response to the force 320, can exert non-equivalent forces 330, 335 and 340 upon the lower layers. In particular, as illustrated in FIG. 3, forces 330 and 335 can be nonexistent, or practically nonexistent, since there can be no portion of the lower layers of the touch screen 110 against which such forces 330 and 335 can act. As can be seen from FIG. 3, when the upper layers of the touch screen 110, such as the glass 230 and the upper PET 250 attempt to move in a downward direction in response to the force 320, they will first contact the force concentrator 310. At such time when the upper layers of the touch screen 110 are already exerting a downward force 340 on the force concentrator 310, there can be only a gap below those portions of the upper layers of the touch screen that would exert forces 330 and 335.

Consequently, the force concentrator 310 acts to concentrate, on to the force-sensitive material 140, the force 320, applied on to the touch screen 110. In particular, as can be seen from FIG. 3, the electrodes 130 and 150, the force-sensitive material 140, and the optically clear adhesive 260 create a protrusion, identified as the force concentrator 310 in FIG. 3, that extends beyond the layer plane of the lower layers of the touch screen 110. Areas of the upper layers of the touch screen 110 that are not over the protrusion, or force concentrator 310, may not be in contact with the lower layers and, as a result, a force 320 applied onto, for example the glass 230 of the touch screen 110, can cause a proportionate force 340 to be applied by the upper layers onto the force concentrator 310. The forces 330 and 335 that correspond to portions of the upper layers that are not over the force concentrator 310 can have nothing to act against and can, as a result, be nonexistent. Consequently, the force 320 applied on to the touch screen 110 can be substantially transferred to the force concentrator 310.

The application of force onto the force concentrator can cause the force-sensitive material 140 to change its electrical or magnetic properties. More specifically, of the elements comprising the force concentrator 310, namely the electrodes 130 and 150, the optically clear adhesive 260 and the force-sensitive material 140, the force-sensitive material 140 can be the only element whose properties can be materially affected by the application of force onto the force concentrator. In one embodiment, the application of the force 340 on the force concentrator 310 can cause the conductive ability of the force-sensitive material 140 to increase. A quantum tunneling composite is one example of a material whose conductivity changes in accordance with an amount of compressive force applied.

A variably conductive material, such as a quantum tunneling composite, can enable the sensing of the application of force 320 on the touch screen 110 because such a varying conductance can variably electrically couple the electrode 130 to the electrode 150. More particularly, and as will be described further below, in one embodiment the electrode 130 can be electrically insulated from the electrode 150 by the force-sensitive material 140, which can be a variably conductive material. As the conductance of the variably conductive force-sensitive material 140 increases, such as due to the application of the force 320 onto the touch screen 110, the electrode 130 can no longer be insulated from the electrode 150, and, indeed, the resistance of the electrical coupling between those two electrodes 130 and 150, through the force-sensitive material 140, can decrease. Such a decrease in the resistance of an electrical coupling between the electrode 130 and the electrode 150 can be sensed, such as will be described further below, and can, consequently, be utilized to detect the application of the force 320 onto the touch screen 110.

In one embodiment, the thickness of the force concentrator 310 can be selected in accordance with the other elements and other layer of the touch screen 110 to provide an appropriate protrusion from the layer plane of the layer from which the force concentrator extends. For example, the thickness of the force-sensitive material 140, or even the electrodes 130 and 150, can be adjusted through common printing or depositing techniques, such as the utilization of multiple passes to deposit a thicker amount of force-sensitive material 140 or the electrodes 130 and 150. Alternatively, the thickness of the optically clear adhesive 260 can be varied to adjust the amount of protrusion of the force concentrator 310. For example, multiple layers of the optically clear adhesive 260 can be applied, or the application of one or more layers of the optically clear adhesive 260 can be limited to the area over some or all of the electrode 130, the force-sensitive material 140 and the electrode 150, thereby further increasing the amount of the protrusion of the force concentrator 310 from the layer plane of an underlying layer of the touch screen 110.

Some force-sensitive materials, such as a quantum tunneling composite, may not change their electrical or magnetic properties linearly in proportion to an increasing application of force. More specifically, as will be known by those skilled in the art, an initial change, such as from an essentially non-conducting state to a conducting state, can occur when an initial force is applied to a variably conductive material, such as the force sensitive material 140. Significantly, such a transition can occur in a discontinuous, or otherwise non-linear, manner. Beyond such an initial transition period, however, the application of additional force can result in substantially linear, or otherwise substantially predictable, variations in, for example, the conductivity of a variably conductive force-sensitive material 140.

Therefore, in one embodiment, the force-sensitive material 140 can be pre-loaded, such that an initial amount of force is already being applied onto the force-sensitive material 140 even without the application of any force by a user onto the touch screen 110. Thus, for example, if the force-sensitive material 140 were a variably conductive material, such as a quantum tunneling composite, the pre-loading could cause the variably conductive material to already operate in a substantially linear, or otherwise substantially predictable, feedback range. The application of a force 320 onto the touch screen 110 could, in such an embodiment, result in a predictable change in the conductivity of the pre-loaded variably conductive material, thereby enabling a sensing system to detect the amount of force applied based on the corresponding change in the conductivity of the conductive material. The above-described pre-loading can be achieved by compressing various layers of the touch screen 110 such that the space between the electrodes 130 and 150 in the force concentrator 310 is less than a rest state thickness of the force-sensitive material 140. For example, and with reference back to FIG. 2, the touch screen 110 could be installed in the housing 220 such that the glass 230 and the housing 220 provide the relevant pressure to pre-load the force-sensitive material 140 beyond a rest state thickness.

Figure 4:
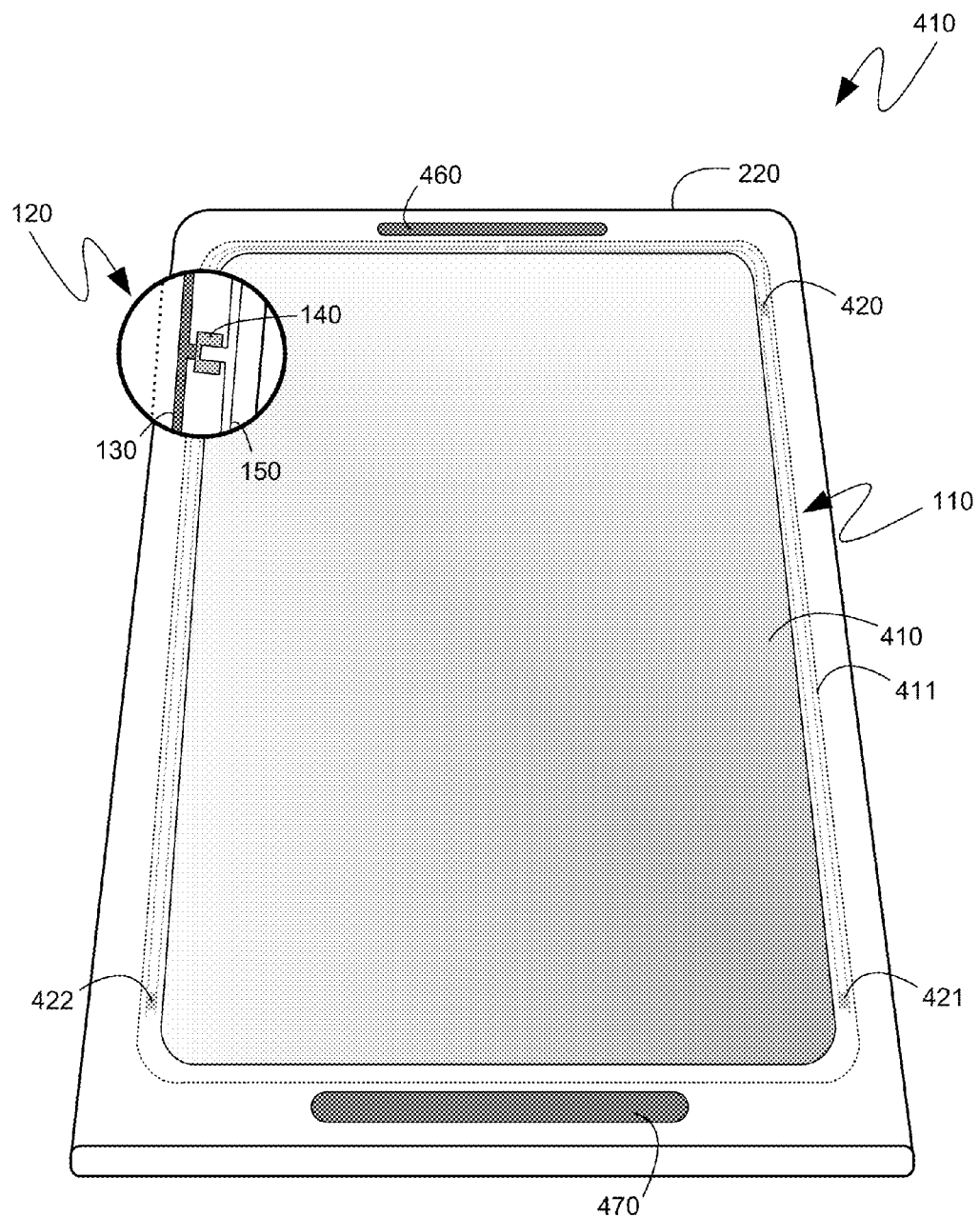
FIG. 4 is a perspective diagram of an exemplary electronic device incorporating an exemplary touch screen with integrated force sensors.

One or more of the above-described force sensors can be integrated into a multi-layer touch screen, such as the touch screen 110, as installed and utilized in an electronic device. For example, turning to FIG. 4, an exemplary electronic device 410 comprising the touch screen 110 is shown. In addition to the touch screen 110, the exemplary electronic device 410 can comprise other input/output elements, such as a speaker 460 for audio output and a microphone 470 for audio input. The exemplary electronic device can be encased in the housing 220, which, in one embodiment, can be configured such that a portion of the touch screen 110 can be on top of the housing 220 with the housing providing support. In particular, as shown in FIG. 4, a portion 410 of the touch screen 110 can correspond to a visual display area, such as would be over the display 210 (not shown). The touch screen 110, however, can extend to the boundary 411, which can be beyond the portion 410, and the area between the portion 410 and the boundary 411 can house one or more force sensors, such as those described in detail above. Thus, as shown in FIG. 2, the area between the portion 410 and the boundary 411 of the touch screen 110 shown in FIG. 4 can have the housing 220 as support, and can accommodate the integrated force sensor described above.

The exemplary electronic device 410 of FIG. 4 is shown comprising four force sensors, including force sensor 120, described in detail above, and other force sensors 420, 421 and 422 that can be analogous to the force sensor 120. As will be understood by those skilled in the art, any number of force sensors can be integrated into a touch screen without departing from the descriptions provided. In the illustrated example of FIG. 4, the four force sensors 120, 420, 421 and 422 are shown positioned at approximately the four corners of the exemplary electronic device 410, though, in other embodiments, other quantities and positioning of the force sensors can be utilized.

As shown in the enlarged area of FIG. 4, the force sensor 120 can comprise electrodes 130 and 150 and the force-sensitive material 140, described in detail above. The electrodes 130 and 150 can, as shown in FIG. 4, extend to one or more other force sensors 420, 421 and 422, such as by extending along the periphery of the touch screen 110 or otherwise continuing onto one or more circuit boards or other like components of the exemplary electronic device 410 that can be located below the touch screen 110 and are, consequently, not shown in FIG. 4.

The circuitry, or other mechanisms, that can utilize the force sensors, such as force sensors 120, 420, 421 and 422, to detect a user's press input on the touch screen 110, can, in one embodiment, merely detect the existence of such an input irrespective of its relative location within the viewable portion 410 of the touch screen 110. Turning to FIG. 5A, an exemplary press detection arrangement 510 is shown, comprising the above described force sensors 120, 420, 421 and 422. As indicated previously, and as will be known by those skilled in the art, the exemplary press detection arrangement 510 illustrates four force sensors, though any number of force sensors could be utilized in such an arrangement without departing from the descriptions provided.

The exemplary press detection arrangement 510 further comprises the electrodes 130 and 150, which, in the arrangement 510, can couple the force sensors 120, 420, 421, 422, and any other force sensors, to the press detection circuitry 520 in a parallel arrangement. As described previously, in one embodiment, the force-sensitive material 140 can be a variably conductive material, such as a quantum tunneling composite, that can transition between a conductive state when force is applied onto the touch screen 110 and a substantially non-conductive state when no force is being applied onto the touch screen 110. Consequently, in FIG. 5A, the force sensors 120, 420, 421 and 422 are illustrated as switches that can transition between a conductive and a substantially non-conductive state.

As will be recognized by those skilled in the art, in the illustrated arrangement of FIG. 5A, with each of the force sensors 120, 420, 421 and 422 being in a substantially non-conductive state, little or no current can flow between the electrode 130 and the electrode 150. Subsequently, if a force 320 were to be applied onto the touch screen 110, at least one of the force sensors 120, 420, 421 and 422 could transition to a conductive state as a result of the application of the force 320, and, consequently, enable the flow of current between the electrode 130 and the electrode 150. Such a current flow can be detected by the press detection circuitry 520, thereby enabling the detection of the force 320.

Because of the parallel nature of the exemplary press detection arrangement 510, the transition of any force sensor from a substantially non-conductive, to a substantially conductive, state can cause the press detection circuitry 520 to detect the application of a force 320 onto the touch screen 110. Consequently, the exemplary press detection arrangement 510 may not be able to identify the specific force sensor transitioning from the substantially non-conductive, to the substantially conductive, state and, as a result, may not be able to detect the approximate location of the force 320 onto the touch screen 110. Nevertheless, as will be recognized by those skilled in the art, the exemplary press detection arrangement 510 can be implemented in a simple and inexpensive manner, and can provide an cost-optimal solution if the mere detection of force, irrespective of its application, is desired.

If, however, it is desirable to provide for the detection of the approximate location of the force 320 onto the touch screen 110, such as, for example, if a user interface of the exemplary electronic device 410 can make use of such information, then, in one embodiment, an exemplary press location detection arrangement 550, such as that illustrated in FIG. 5B, can be utilized, while, in another embodiment, touch screen technologies, such as the capacitive mechanisms described above, can be utilized in conjunction with one or more force sensors, such as those described, to further aid in the detection of the approximate location of the force. In FIG. 5B, the exemplary press location detection arrangement 550 can comprise the force sensors 120, 420, 421 and 422, though, as indicated previously, fewer or greater numbers of force sensors can be equally accommodated by the exemplary press location detection arrangement 550 without departing from the descriptions provided. The exemplary press location detection arrangement 550 can, like the exemplary press detection arrangement 510, further comprise press detection circuitry 520, though, in the exemplary press location detection arrangement 550, such press detection circuitry 520 can comprise a time-sampling microcontroller 560, or other similar electronic or magnetic device.

Each of the force sensors 120, 420, 421 and 422 are shown in the exemplary press location detection arrangement 550 of FIG. 5B as being independently electrically connected to the time-sampling microcontroller 560. Thus, the force sensor 120 can be electrically connected to the time-sampling microcontroller 560 via the electrode 130, while the other force sensors 420, 421 and 422 can be independently electrically connected via corresponding electrodes 530, 531 and 532, respectively. The electrode 150 of the force sensor 120 can be a common electrode that connects the other force sensors 420, 421 and 422 together. In various embodiments, the common electrode 150 can be connected to ground, a reference voltage or some other common connection and can, likewise be connected to an appropriate input of the time-sampling microcontroller 560 depending, as will be understood by those skilled in the art, on the design of the time-sampling microcontroller 560 selected.

The force sensors 120, 420, 421 and 422 are shown in the exemplary press location detection arrangement 550 as variable resistors since, as described in detail above, the force-sensitive material 140 can be pre-loaded to operate in a substantially linear range and, if a variably conductive material, such as a quantum tunneling composite, is used, such varying conductance that is responsive to the application of force 320 onto the touch screen 110 can be modeled as a variable resistor. In one embodiment, the time-sampling microcontroller 560 can periodically measure the resistive values of the force sensors 120, 420, 421 and 422, or, more specifically, the resistive values of the variably conductive force sensitive material 140 of the individual force sensors 120, 420, 421 and 422. Such a measurement can be made with reference to an internal or external "reference resistor" whose resistive value is known beforehand.

When a force, such as the force 320 shown in FIG. 3, is applied to the touch screen 110, the variably conductive force sensitive material 140 of one or more individual force sensors 120, 420, 421 and 422 can change its conductance, as described in detail above. The time-sampling microcontroller 560, during one or more of the periodic measurements of the resistive values of the force sensors 120, 420, 421, 422 can detect such a change and can, as a result, determine that a force 320 is being applied onto the touch screen 110. However, the application of a force, such as the force 320 of FIG. 3, onto the touch screen 110, while it can be transferred to a force sensor via a force concentrator, such as the force concentrator 310, as opposed to another portion of the touch screen 110, it need not be transferred equally to each force sensor. Instead, as will be understood by those skilled in the art, the one or more force sensors closest to the location of the application of a force onto the touch screen 110 are likely to receive most of the applied force, via their respective force concentrators. As a result, their conductance is likely to experience a greater change than the conductance of other force sensors physically located further from the application of the force. Thus, by monitoring the individual resistances of each of the force sensors 120, 420, 421, 422, and by detecting variances among them, the time-sampling microcontroller 560 can provide information that can not only indicate the presence of an application of force onto the touch screen 110, but that can also indicate a likely region of the touch screen 110 onto which such force was applied. As indicated previously, such information can supplement location information that may have been provided by the touch screen mechanisms themselves.

As can be seen from the above descriptions, mechanisms for detecting the application of force onto a touch screen have been presented. In view of the many possible variations of the subject matter described herein, we claim as our invention all such embodiments as may come within the scope of the following claims and equivalents thereto.

We claim:

1. A force sensor integrated into a multi-layer touch screen, the force sensor comprising:
   a variably conductive material whose conductivity changes in accordance with an amount of compressive force applied to the variably conductive material;
   a first electrode positioned on a first side of the variable conductive material and between the variably conductive material and a first layer of the multi-layer touch screen, the first electrode being conductively connected to another first electrode of another force sensor; and
   a second electrode positioned on a second side of the variably conductive material opposite the first side of the variably conductive material and between the variably conductive material and a second layer of the multi-layer touch screen that is substantially parallel to the first layer, the second electrode being conductively connected to another second electrode of the other force sensor;
   wherein the variably conductive material, the first electrode, and the second electrode form a protrusion from a layer plane of the second layer, the protrusion extending towards the first layer, and
   wherein a space between the first layer of the multi-layer touch screen and the second layer of the multi-layer touch screen is smaller than a rest state thickness of the variably conductive material in combination with a thickness of the first and second electrodes.

2. The force sensor of claim 1, wherein:
   an optically clear adhesive between the first layer of the multi-layer touch screen and the second layer of the multi-layer touch screen is also layered over the first electrode, the variably conductive material and the second electrode; and
   the protrusion from the layer plane of the second layer extending towards the first layer is further formed from the optically clear adhesive layered over the first electrode, the variably conductive material, and the second electrode.

3. The force sensor of claim 1, wherein the variably conductive material includes a quantum tunneling composite.

4. The force sensor of claim 1, wherein the multi-layer touch screen is a mutual-capacitance based touch screen with the first layer comprising a first set of electrodes and the second layer comprising a second set of electrodes intersecting the first set of electrodes such that each intersection forms a capacitive element of the mutual-capacitance based touch screen.

5. The force sensor of claim 1, wherein the force sensor is integrated into the multi-layer touch screen at the periphery of the multi-layer touch screen.

6. The force sensor of claim 1, wherein the protrusion concentrates, onto the variably conductive material, a force applied to at least one of the first layer and the second layer, thereby effecting the variably conductive material's conductive coupling of the first electrode to the second electrode.

7. An electronic device capable of distinguishing between touch input and press input, the electronic device comprising:
   touch detection circuitry for identifying the touch input;
   press detection circuitry for identifying the press input; and
   a multi-layer touch screen for receiving the touch input, the multi-layer touch screen comprising a first layer, a second layer that is substantially parallel to the first layer, and at least one integrated force sensor for receiving the press input, the at least one integrated force sensor being located between the first layer and the second layer and forming a protrusion from a layer plane of the second layer extending towards the first layer, the at least one integrated force sensor comprising:
   a variably conductive material whose conductivity changes in accordance with an amount of compressive force applied to the variably conductive material;
   a first electrode positioned on a first side of the variably conductive material and between the variably conductive material and the first layer of the multi-layer touch screen; and
   a second electrode positioned on a second side of the variably conductive material opposite the first side of the variably conductive material and between the variably conductive material and the second layer of the multi-layer touch screen, wherein the variably conductive material is preloaded so that a space between the first layer of the multi-layer touch screen and the second layer of the multi-layer touch screen is smaller than a rest state thickness of the variably conductive material in combination with a thickness of the first and second electrodes and the variably conductive material operates in a linear feedback range.

8. The electronic device of claim 7, wherein:
the press input provides a force onto at least one of the first layer and the second layer, the provided force being concentrated, by the protrusion of the at least one integrated force sensor, onto the variably conductive material and thereby effecting the variably conductive material's conductive coupling of the first electrode to the second electrode; and
the effect to the conductive coupling is detectable by the press detection circuitry.

9. The electronic device of claim 7, wherein the multi-layer touch screen further comprises an optically clear adhesive layered over the second layer and the at least one integrated force sensor such that the optically clear adhesive is between the first layer and the second layer and between the first layer and the at least one integrated force sensor.

10. The electronic device of claim 7, wherein the multi-layer touch screen further comprises at least two integrated force sensors, wherein a first electrode of a first of the at least two integrated force sensors is conductively connected to a first electrode of a second of the at least two integrated force sensors and a second electrode of the first of the at least two integrated force sensors is conductively connected to a second electrode of the second of the at least two integrated force sensors, and wherein further the press detection circuitry identifies the press input by detecting a change in a combined conductivity of the at least two integrated force sensors.

11. The electronic device of claim 7, wherein the multi-layer touch screen further comprises at least two integrated force sensors, wherein a first electrode of a first of the at least two integrated force sensors is conductively connected to the press detection circuitry separately from a first electrode of a second of the at least two integrated force sensors that is also conductively connected to the press detection circuitry, and wherein further the press detection circuitry identifies the press input by detecting a change in an individual conductivity of at least one of the at least two integrated force sensors.

12. The electronic device of claim 11, wherein the press detection circuitry comprises a time sampling microcontroller to detect the change in the individual conductivity of at least one of the at least two integrated force sensors.

13. A force sensor integrated into a multi-layer touch screen, the force sensor comprising:
a variably conductive material whose conductivity changes in accordance with an amount of compressive force applied to the variably conductive material;
a first electrode positioned on a first side of at least a portion of the variably conductive material and vertically between the at least a portion of the variably conductive material and a first layer of the multi-layer touch screen;
a second electrode positioned on a second side of the at least a portion of the variably conductive material opposite the first side of the variably conductive material and vertically between the at least a portion of the variably conductive material and a second layer of the multi-layer touch screen that is substantially parallel to the first layer; and
an adhesive extending between the first layer of the multi-layer touch screen and the second layer, a first portion of the adhesive extending along a plane which extends through the second electrode and a second portion of the adhesive extending between the first layer and the first electrode,
wherein the variably conductive material, the first electrode, and the second electrode form a protrusion from a layer plane of the second layer, the protrusion extending into the adhesive towards the first layer, and
wherein at least a portion of the variably conductive material is positioned horizontally between a portion of the first electrode and a portion of the second electrode, each of the portions being positioned in a plane parallel to the layer plane of the second layer.

14. The force sensor of claim 13, wherein:
an optically clear adhesive between the first layer of the multi-layer touch screen and the second layer of the multi-layer touch screen is also layered over the first electrode, the variably conductive material and the second electrode; and
the protrusion from the layer plane of the second layer extending towards the first layer is further formed from the optically clear adhesive layered over the first electrode, the variably conductive material, and the second electrode.

15. The force sensor of claim 13, wherein a space between the first layer of the multi-layer touch screen and the second layer of the multi-layer touch screen is smaller than a rest state thickness of the variably conductive material in combination with a thickness of the first and second electrodes.

16. The force sensor of claim 13, wherein the multi-layer touch screen is a mutual-capacitance-based touch screen with the first layer comprising a first set of electrodes and the second layer comprising a second set of electrodes intersecting the first set of electrodes such that each intersection forms a capacitive element of the mutual-capacitance based touch screen.

17. The force sensor of claim 13, wherein the force sensor is integrated into the multi-layer touch screen at the periphery of the multi-layer touch screen.

18. The force sensor of claim 13, wherein the protrusion concentrates, onto the variably conductive material, a force applied to at least one of the first layer and the second layer, thereby effecting the variably conductive material's conductive coupling of the first electrode to the second electrode.

19. An electronic device capable of distinguishing between touch input and press input, the electronic device comprising:
touch detection circuitry for identifying the touch input;
press detection circuitry for identifying the press input; and
a multi-layer touch screen for receiving the touch input, the multi-layer touch screen comprising a first layer, a second layer that is substantially parallel to the first layer, an adhesive extending between the first layer of the multi-layer touch screen and the second layer, a first portion of the adhesive extending between the first layer and a first electrode and a second portion of the adhesive extending along a plane which extends through a second electrode, and at least one integrated force sensor for receiving the press input, the at least one integrated force sensor being located between the adhesive and the second layer and forming a protrusion from a layer plane of the second layer extending into the adhesive towards the first layer, the at least one integrated force sensor comprising:
a variably conductive material whose conductivity changes in accordance with an amount of compressive force applied to the variably conductive material, the variably conductive material being preloaded so that a space between the first layer and the second layer is smaller than a rest state thickness of the variably conductive material in combination with a thickness of the first and second electrodes and the adhesive and the variably conductive material operates in a linear feedback range;

the first electrode positioned on a first side of the at least a portion of the variably conductive material and vertically between the at least a portion of the variably conductive material and the first layer of the multi-layer touch screen, the first electrode being conductively connected to another first electrode of another force sensor; and the second electrode positioned on a second side of the at least a portion of the variably conductive material opposite the first side of the variably conductive material and vertically between the at least a portion of the variably conductive material and the second layer of the multi-layer touch screen, the second electrode being conductively connected to another second electrode of the other force sensor, wherein at least a portion of the variably conductive material is positioned horizontally between a portion of the first electrode and a portion of the second electrode, each of the portions being positioned in a plane parallel to the layer plane of the second layer.

20. The electronic device of claim 19, wherein:

the press input provides a force onto at least one of the first layer and the second layer, the provided force being concentrated, by the protrusion of the at least one integrated force sensor, onto the variably conductive material and thereby effecting the variably conductive material's conductive coupling of the first electrode to the second electrode; and the effect to the conductive coupling is detectable by the press detection circuitry.

21. The electronic device of claim 19, wherein the multi-layer touch screen further comprises an optically clear adhesive layered over the second layer and the at least one integrated force sensor such that the optically clear adhesive is between the first layer and the second layer and between the first layer and the at least one integrated force sensor.

22. The electronic device of claim 19, wherein:

the multi-layer touch screen further comprises at least two integrated force sensors, a first electrode of a first of the at least two integrated force sensors is conductively connected to a first electrode of a second of the at least two integrated force sensors and a second electrode of the first of the at least two integrated force sensors is conductively connected to a second electrode of the second of the at least two integrated force sensors, and the press detection circuitry identifies the press input by detecting a change in a combined conductivity of the at least two integrated force sensors.

23. The electronic device of claim 19, wherein:

the multi-layer touch screen further comprises at least two integrated force sensors, a first electrode of a first of the at least two integrated force sensors is conductively connected to the press detection circuitry separately from a first electrode of a second of the at least two integrated force sensors that is also conductively connected to the press detection circuitry, and the press detection circuitry identifies the press input by detecting a change in an individual conductivity of at least one of the at least two integrated force sensors.

24. The electronic device of claim 23, wherein the press detection circuitry comprises a time sampling microcontroller to detect the change in the individual conductivity of at least one of the at least two integrated force sensors.

25. The electronic device of claim 19, wherein a space between the first layer of the multi-layer touch screen and the second layer of the multi-layer touch screen is smaller than a rest state thickness of the variably conductive material in combination with a thickness of the first and second electrodes.

* * * * *